Sept. 17, 1957 E. F. HUDDLE 2,806,340
DOUBLE PITMAN POSITIONER FOR MOWERS
Filed May 12, 1955

Inventor:
Edwin F. Huddle
Paul O. Pippel
Atty.

United States Patent Office 2,806,340
Patented Sept. 17, 1957

2,806,340

DOUBLE PITMAN POSITIONER FOR MOWERS

Edwin F. Huddle, Elmwood Park, Ill., assignor to International Harvester Company, a corporation of New Jersey Application May 12, 1955, Serial No. 507,821

9 Claims. (Cl. 56—283)

This invention relates to mowers of the type which employ a pair of counter-reciprocating elements.

A general object of the invention is to provide a novel means for positioning the two pitmans attendant to raising the mower for transport so that they will not interfere with or lock the mower bar against its being lowered.

A more specific object of the invention is to provide a novel means for moving the pitmans responsive to upward swinging of the mower bar for transport to a position aligning their centers of connection to the reciprocating members with the center of movement of the mower bar from operating to transport position and vice versa.

These and other objects of the invention will become more apparent from the specification and the drawings, wherein.

Figure 1:
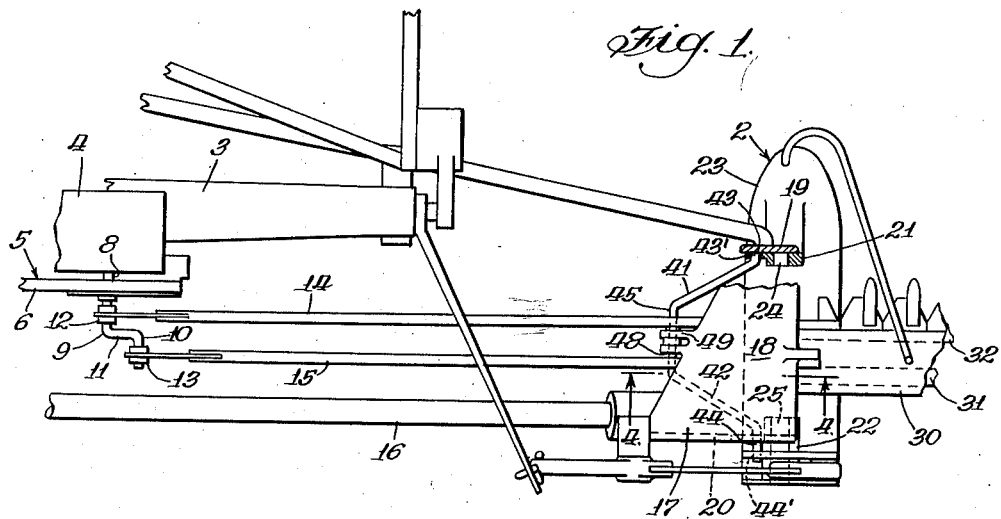
Figure 1 is a fragmentary plan view partially in horizontal section illustrating the mower with the invention applied thereto.

The mower generally indicated 2 is of conventional construction and has a frame structure substantially of the type shown in U. S. Patent 2,269,982 and comprises the usual transverse frame member 3 which supports the carrier 4 which mounts the transmission generally indicated 5 for operating the mower and as herein shown the said transmission includes a belt 6 which drives a driven pulley 7, the pulley 7 being connected to a shaft 8 rotatably supported from the carrier 4. A crank structure 11 is connected to the pulley 7 and includes a pair of oppositely directed throws 9 and 10 which are spaced 180° apart. The throws 9 and 10 journal the bearings 12 and 13 respectively which are mounted in the inner ends of the pitmans 14 and 15.

Figure 2:
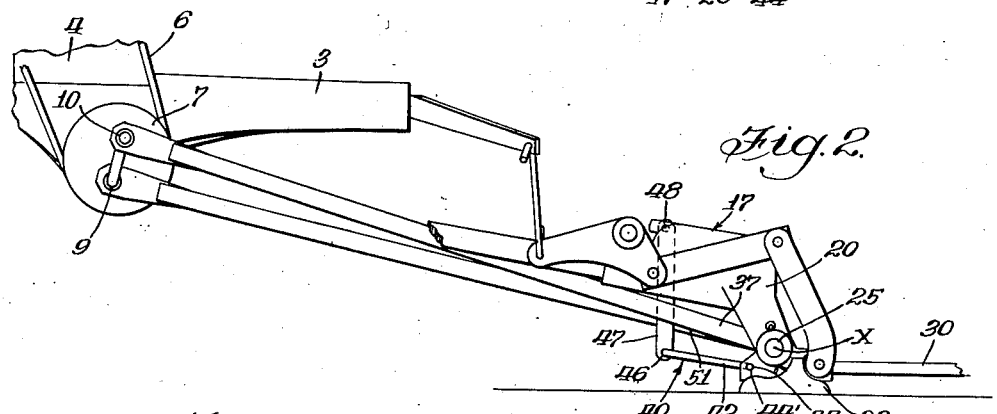
Figure 2 is a rear view of the structure shown in Figure 1.
Figure 3:
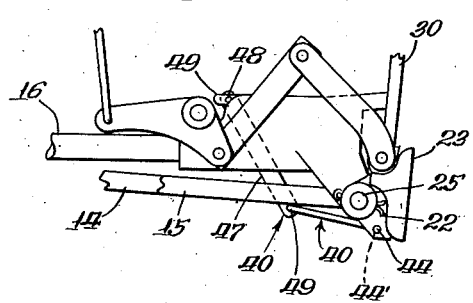
Figure 3 is a further fragmentary view comparable to Figure 2 but showing the mower bar in transport position.
Figure 4:
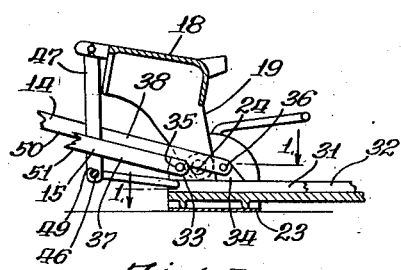
Figure 4 is a longitudinal vertical sectional view taken substantially on the line 4—4 of Figure 1.

The pitmans 14 and 15 parallel the coupling bar arm 16 which is suitably connected to and forms part of the frame structure 3 as shown in the aforementioned patent and the outer end of the coupling arm 16 is connected to a yoke 17. The yoke includes a top wall 18 and dependent front and rear walls 19 and 20. The walls 19 and 20 embrace the ears 21 and 22 upstanding from and integral with the inner mower shoe 23. The ear 21 is hinged to the wall 19 by means of a pin 24 which for purpose of illustration only is shown formed integral with the wall 19 and the ear 22 is hinged on a pin 25 which is passed through suitable apertures in the wall 20 and the eye of lug 22. It will be realized that the pins 24 and 25 are arranged coaxial on a fore and aft generally horizontally extending axis indicated X in Figure 2 and that the shoe 23 with the mower bar 30 which is secured thereto is swingable vertically about this axis.

The mower bar 30 supports two counter-reciprocal elements which in the present instance include a counter-weight element 31 and the sickle element 32 which are adapted to be reciprocated in opposite direction in counter-balancing relationship to each other longitudinally of the mower bar 30. The inner or stubbleward ends of the counter-weight and the mower bar are provided with upstanding connecting elements or heads 33 and 34 respectively which are pivotally connected as at 35 and 36 to the outer lower ends 37 and 38 of the pitmans 15 and 14. It will be appreciated that the pivots 35 and 36 operate in the plane of the axis of the pins 24 and 25 and that to accommodate downward tilting of the mower bar assembly 30 it is mandatory to line up the pivots 35, 36 and the pins 24 and 25 so that the same are coaxial for otherwise the pitmans and the elements to which they are connected fall where the bar is lifted and the centers 35, 36 are below the axis X so that the bar cannot be lowered without breaking the pitmans.

In order to hold the pitmans 14 and 15 with their pivotal connections 35 and 36 coaxial with the axis of vertical swing of the mower bar a pitman positioner generally designated 40 is provided and in essence comprises a bail having a pair of laterally spaced front and rear legs 41 and 42 and the outer ends of the legs are provided with out-turned pivot portions 43 and 44 which are journalled in the upstanding ear portions 21 and 22 of the inner shoe in openings therein designated 43' and 44' and these are disposed eccentrically inwardly and below with respect to the axis X of the pins 24 and 25 about which the mower swings. The inner ends of the legs 41 and 42 are interconnected by a bight member or abutment element 45 which passes under both pitmans 14 and 15 and intermediate its ends is pivoted as at 46 to the lower end of a strap or hanger 47 which extends upwardly between the pitmans 14 and 15 and at its upper ends is pivoted as at 48 to an ear structure 49 formed integral with the top wall 18 of the yoke. The axis of rotation of points 48, 46 are parallel to the axis X and the lengths of the legs 41, 42 and the length of link 47 is so proportioned that the upper edge 49 of the transverse portion or carrier 45 of the bail will engage the lower edges 50 and 51 of the pitmans 14 and 15 at an elevation disposing the two pitmans (the vertical thickness of the pitmans being considered and the spacing of the pivot points 35 and 36 from the lower edges of the pitmans being also considered) in a position with said axes of pivots 35 and 36 coaxial with the axis X when the bar 30 is lifted.

It will be understood that when the mower is stopped preparatory to lifting the mower bar for transport one pitman may be at one side of the axis X and the other at the opposite side of the axis X and that when the mower bar is swung upwardly the pitman which is above the axis will drop down and the pitman which is below the axis will be lifted. This device has been actually made and used and has performed successfully as indicated.

What is claimed is:

1. For use in a mower of the type comprising mounting means, a mower bar pivoted on a generally horizontal axis to said mounting means and vertically swingable from a generally horizontal operating position to an upright transport position, said mower including a pair of elements mounted for reciprocation on said mower bar, and means for reciprocating said elements comprising a pair of pitmans pivotally connected to respective elements on axes generally parallel to said axis, the improvement comprising: means for positioning said pitmans with their said axes of pivot coaxial with said axis of pivot of the mower bar relative to said mounting means coincident with the upright positioning of said mower and comprising a carrier underposed with respect to said pitmans, and linkage connected to and operative between said mounting means and said carrier and other linkage connected to and operative between said carrier and said mower bar for moving said carrier into a position supporting said pitmans with their axes of pivot coaxial with said pivotal axis in response to raising of the mower bar to transport position.

2. In a mower of a type comprising a frame, a mower bar pivoted on the frame on a generally horizontal axis, a pair of elements reciprocal on the cutter bar, a pair of pitmans pivotally connected to respective elements at one end on axes generally parallel and adjacent to said axis and axially alignable therewith in one position of the pitmans, the improvement described in the operating position of the mower comprising: a support member extending transversely of the pitmans therebeneath, an upright linkage pivoted at vertical spaced points to said frame and to said support member and another linkage connected at horizontally spaced points to said support member and pivoted to said cutter bar, and said first and second-mentioned linkage cooperatively adapted to position said support member in a position supporting said pitmans with their axes of pivot coincident with the axis of pivot of the mower bar relative to the frame in response to swinging said bar to upright transport position.

3. In a mower of the type comprising a frame and a mower assembly including a mower bar pivoted to the frame on a generally horizontal axis and a pair of reciprocal elements carried by the bar, said elements having inner ends proximate said axis and a pair of pitmans pivotally connected to the inner ends of respective elements and extending lengthwise in a direction away from the mower bar, means for driving the pitmans including a double throw crank rotatably supported from said frame and having its throws connected to respective pitmans, the improvement comprising: means for supporting said pitmans in a position disposing said axes of pivot thereof with said elements coaxial with said axis of pivot of the mower bar relative to said frame in response to positioning said mower assembly in an upright transport position and comprising first and second links pivotally interconnected on a generally horizontal axis one of said links extending upwardly and pivoted to the frame at a pivot above said last-mentioned axis, the other of said links extending from said last-mentioned axis toward said mower bar and connected thereto at a point below said last-mentioned axis, and support means carried by one of said links in underposed relation with respect to both of said pitmans and positionable by said linkage to support said pitmans in said position.

4. In a mower of the type conprising a frame and a mower assembly comprising a mower bar and a pair of elements reciprocally carried thereby, means pivoting one end of said bar to the frame on a generally horizontal axis for vertical swinging movement from a generally horizontal operating position to an upright transport position, said elements having ends proximate said axis, a pair of pitmans arranged in side by side relation, and extending outwardly from said one end of said bar and having corresponding ends pivotally connected to adjacent ends of respective elements on generally horizontal axes substantially coplanar with said axis and operative to slide in the operating position of the mower to and fro from one side to the other of said axis and to drop below said axis in the upright position of the mower bar, means carried by the frame and including a double crank having throws connected to the other ends of respective pitmans, the improvement comprising: means for positioning said pitmans in the upright position of the mower bar with said axes of pivot between said pitmans and elements in substantially coaxial alignment and including a bail having a pair of laterally spaced legs pivoted at corresponding ends to said mower bar on an axis generally parallel to and below said axis of connection between the frame and the mower bar, said legs extending outwardly from said bar and having ends remote from the bar, a bight portion interconnecting said last-mentioned ends of said legs and extending transversely of the pitmans therebeneath, and an upright link having a lower end pivoted to said bight portion on a generally horizontal axis and an upper end pivoted to the frame at a point outwardly of said last-mentioned axis as respects to said mower bar and above the axis of pivot of the bar with said frame.

5. For use in a mower of the type having a frame and a mower assembly including a mower bar pivoted at one end to the frame on a generally horizontal axis and swingable from a generally horizontal operating position to an upright transport, said assembly comprising a sickle element and a counterweight element reciprocal on the mower bar and having inner ends proximate said axis, a pair of pitmans disposed side by side and respectively pivotally connected at one end to said sickle element and said counterweight element on axes generally parallel to said axis, said pitmans extending upwardly and outwardly from said inner ends of said elements, and linkage connected between said mower bar and said frame including an abutment member underposed with respect to said pitmans for disposing said pitmans in a position with said axes of connection to said elements, coaxially aligned with said axis in response to movement of said mower bar from operating to transport position.

6. The invention according to claim 5 and said linkage comprising a first member extending generally horizontally and pivoted at one end to said mower bar at a point below said axis and extending outwardly from the bar lengthwise thereof and having an opposite end beneath said pitmans, an upright member having a lower end and having an upper end pivoted to the frame at a point offset outwardly from its lower end, and said abutment member connected to said first and said upright members.

7. The invention according to claim 5 and said linkage comprising a pair of links pivotally interconnected at one of their ends and pivoted respectively to said mower bar and to said frame and formed and arranged to develop a lifting component therebetween and said abutment means connected to one of said members.

8. The invention according to claim 5 and said linkage including a U-shaped member having a cross-piece constituting said abutment means with respect to said pitmans and having spaced legs extending from said cross-piece to said bar and pivoted thereto on an axis below the first mentioned axis, and an upright link having one end pivoted to the crosspiece and having another end pivoted to the frame.

9. In a mower of the class described having a bar and a pair of counter-reciprocating elements thereon, a frame and means pivotally connecting the bar with the frame on a generally horizontal axis accommodating vertical swinging movement of the bar, a pair of pitmans pivoted on generally horizontal axes to respective elements adjacent to said axis and having a position disposing said axes in alignment with said axis to accommodate unrestricted upward and downward swinging movement of the bar, and mechanism connected to said frame and bar and having abutment means, said mechanism responsive to upward movement of the bar to engage said abutment means with the pitmans for disposing the same in said position.

References Cited in the file of this patent
UNITED STATES PATENTS 786,202    Gagne  ---------------- Mar. 28, 1905
807,771    Bacon  ---------------- Mar. 3, 1908